Bailie & Gervers,
Bread Machine.

N° 61,307.  Patented Jan. 22, 1867.

Witnesses.
N. Marchant
H. Collins

Inventor.
John Bailie
Jos. Gervece

United States Patent Office.

JOHN BAILIE AND JOSEPH GERVERS, OF CINCINNATI, OHIO.

*Letters Patent No. 61,307, dated January 22, 1867.*

IMPROVED DOUGH MIXER AND ROLLER.

*The Schedule referred to in these Letters Patent and making part of the same.*

TO ALL WHOM IT MAY CONCERN:

Be it known that we, JOHN BAILIE and JOSEPH GERVERS, of Cincinnati, in the county of Hamilton, and State of Ohio, have invented a new and useful improvement on a machine for Mixing Dough; and we do hereby declare that the following is a full, clear, and exact description of the construction and operation of the same, reference being had to the annexed drawings, making a part of this specification, in which—

The nature of our invention consists, first, in combining a pair of rolls with a worm or screw dough-mixer; second, the combination of the screw or worm of a dough-mixer with a carrying band or belt; third, the combination of the spur and worm-gear with the worm or screw of a dough-mixing machine.

To enable others skilled in the art to make and use our invention, we will proceed to describe its construction and operation.

Figure 1:
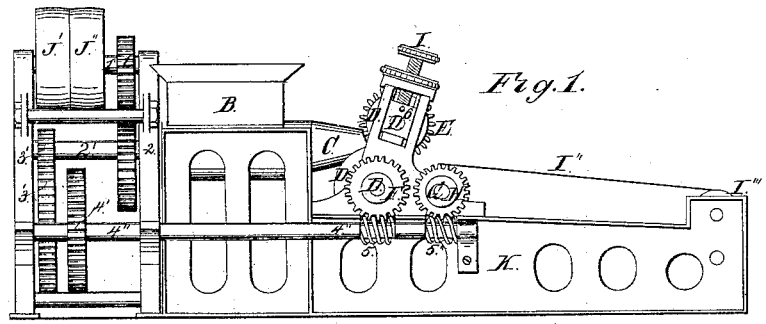
Figure 1 is a longitudinal elevation.
Figure 2:
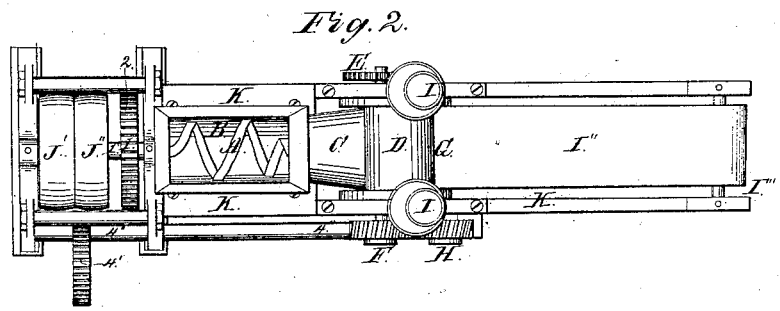
Figure 2 is a plan view.
Figure 3:
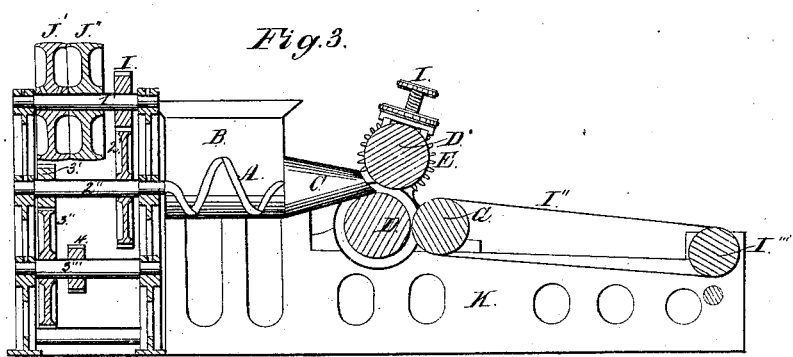
Figure 3 is a longitudinal section.

We construct our dough-mixing and slabbing machine as follows: The screw or worm A, figs. 1 to 3, as used in our machine, is of the well-known form in use, and is placed in a chamber or hopper B, figs. 1, 2, 3, having a mouth-piece C, circular in form, at its inner end, and of the same diameter as chamber B. Its outer end, next to the rolls D D', is widened out and thinned down to suit the width of said rolls, which are set directly in front of it, and are geared together at E E. The lower roll is driven by a worm, 5, and wheel F, and revolves in fixed boxes, while the upper one, D, is adjustable by means of the sliding boxes 6 and screws I, which regulate the thickness of the slab of dough. The roll G is driven by worm 5' and wheel H, carrying the band I'' upon which the dough is conveyed as it is delivered from the rolls; this band passes around an idle roll, I''', at the extreme end of the machine. Motion is communicated to the machine by pulleys J' J'', one of which is loose. The pulleys revolve at a rapid speed and carry a spur pinion 1 on shaft 1'; said pinion gears into a large wheel, 2' on shaft 2''; this shaft carries the worm or screw mixer A and pinion 3', which gears into wheel 3'' on shaft 3''', upon which pinion 4 is secured and gears into wheel 4' on the main feed shaft 4''; said shaft carrying two worms 5' 5'', one of which gears into wheel F, driving roll E; the other gears into H, driving the roll and band I'' continuously. This arrangement of gearing we find quite essential in order to reduce the speed for the rolls D D'; also to get the necessary power to work the worm through the dough, which becomes quite tough.

Operation: Power being applied to pulleys J, the machine is set in motion. Flour and water being put into the hopper B, is stirred and mixed by the worm or screw A until it becomes tough enough to be forced through the mouth-piece C, when it is taken hold of by the slabbing rolls D D', and fully compressed into a flat slab, when it is carried out upon the carrying belt I'' in a condition to be operated upon by the other machines as are in general use in power bakeries. This slabbing operation greatly reduces the danger incident to rolling the dough as it passes from the mixer. In the old process it came out in broken fragments that had to be forced together and into other rolls by hand, which was quite dangerous.

Having fully described the nature, construction, and operation of our invention, what we claim, and desire to secure by Letters Patent, is—

1. The combination of the rolls D D' with the worm or screw dough-mixer A, in the manner and for the purpose set forth.

2. We claim the combination of the carrying band or belt I and slabbing rolls D D', with a worm or screw dough-mixer, in the manner and for the purpose substantially as specified.

3. We further claim the combination and arrangement of the spur and worm gear as shown for regulating the speed and giving a positive motion to the screw A, slabbing rolls D D', and carrying band I'', for the purpose and in the manner substantially as described.

JOHN BAILIE,
JOS. GERVERS.

Witnesses:
N. MARCHANT,
C. H. COLLINS.